Patented Nov. 26, 1946

2,411,822

UNITED STATES PATENT OFFICE 2,411,822

LIQUID PHASE DIMERIZATION

Thomas F. Doumani, Long Beach, Calif., assignor to Union Oil Company of California, Los Angeles, Calif., a corporation of California No Drawing. Application March 23, 1943,
Serial No. 480,219

4 Claims. (Cl. 260—666).

This invention relates to the production of the simplest polymer, namely the dimer, of relatively low boiling conjugated dienes (diolefins) and particularly to the thermal dimerization of butadiene in the liquid phase.

It is known that conjugated dienes polymerize readily to form rubbery or resinous polymers, some of which are very useful, as in the case of synthetic rubber and synthetic resins, and some of which are undesirable, as the gum in gasoline. It has now been found that under certain conditions even in dilute mixtures and those containing mono-olefins, conjugated dienes can also be polymerized almost exclusviely to the dimer which in the case of butadiene for example, is a relatively stable colorless liquid boiling about 130° C. The dimer may readily be separated from other reaction products and unreacted materials and may be etiher depolymerized to obtain excellent yields of relatively pure monomer or utilized in the dimer form. It is an object of this invention to provide a novel and efficient method for carrying out the dimerization reaction whereby a product of unusually high purity is obtained. According to this invention, the conjugated diene is dimerized in the liquid phase at a temperature between about 100° C. and 300° C. and preferably between about 110° C. and the critical temperature of the diene. A feature of the process lies in the repression of resinous polymer formation by the exclusion of traces of oxygen.

A particularly desirable method of carrying out the dimerization continuously, involves charging the diene containing feed stock to a fractionating column whereby the dimer is separated from the monomer as formed. It has been found that very little resinous type polymer is formed in the liquid phase dimerization and that the liquid produced is substantially pure dimer; that is, contains very little resinous polymer or intermediate polymer such as trimer and tetramer, etc.

The process of this invention may be applied to any conjugated diene, but is particularly applicable to those having less than about 7 carbon atoms in their molecular structure, such as butadeine, isoprene, cyclopentadiene, etc. These latter three constitute a preferred group. The diene may be present in the liquid feed stock to be dimerized in admixture with any other hydrocarbons of approximately the same boiling range, that is, hydrocarbons boiling between about −20° C. and +100° C., and these admixed hydrocarbons may include olefins such as butenes, amylenes, etc., or even certain acetylene homologs. Upon moderate heating at the temperatures specified above and at sufficient pressure to maintain a liquid phase reaction, dienes in these feed stocks are converted to dimers, while the bulk of other olefinic materials present, especially the acyclic monoolefins, remain unchanged. The structure of the dimers is generally cyclic, with two double bonds, one of which may be in the ring and another in a side chain. Various isomers probably exist. For example, the structure of the normal dimer of butadiene is indicated at (1) below, although it may also exist in the form of various isomers, such as those indicated at (2) and (3) below and probably others.

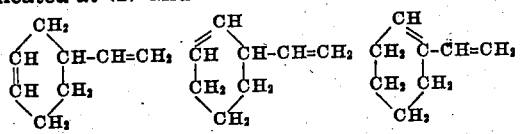

The product of the liquid phase dimerization of this invention is generally composed largely of a single isomer, probably No. 1 above in the case of butadiene. The fact that this product is largely a single isomer, as well as the absence of large amounts of higher polymers makes the liquid phase dimer especially valuable both for depolymerization to the monomers and for chemical utilization purposes.

With regard to the elimination of resinous polymer it has also been found that the presence of even traces of air or oxygen or peroxides, such as may be present in feed stocks which have been exposed to the air only casually, increases the formation of resinous polymer markedly and, therefore, when pure dimer is desired, it is important to eliminate all air from the reaction system. This may be done, for example, by bleeding small amounts of gas from a vapor space above the liquid feed stock just prior to or during the reaction. The feed stock may also be freed of peroxides by pre-treatment with reducing agents such as ferrous salts, metallic thiosulfates and sulfites, etc.

The process of the present invention may be carried out by various batch, semi-continuous or continuous methods. Feed stocks obtained from cracking operations are especially suitable. In a specific operation of a batch process, for example, a feed stock was employed which consisted of a fraction obtained from cracking of a heavy gasoline fraction from a naphthenic California crude oil at a temperature in the region of 1500° F. in the presence of hot flue gases. This fraction consisted of hydrocarbons having 3 and 4 carbon atoms (predominantly 4 carbon atoms) and contained about 50% butadiene as well as about 40% butenes (both iso and normal), 5% of butanes (both iso and normal) and 5% of acetylenes (methyl, ethyl, and vinyl). This feed stock was liquefied by cooling and application of pressure, and charged to a bomb. The bomb and contents were then heated to about 140° C. to 150° C. just under the critical temperature of the butadiene (163° C). and maintained at this temperature under sufficient pressure to maintain a liquid phase reaction (initially about 500 lbs. gage) for about 12 hours. To insure the absence of air, a small amount of vapor was bled from the top of the bomb. Under these conditions, a substantial conversion, about 50% of the butadiene present, to a liquid crude dimer was obtained. This crude dimer was light yellow in color, and when fractionally distilled was separated to obtain approximately 60% of a single isomer boiling at 130° C. at atmospheric pressure and having a refractive index $n_D$ of 1.4630 at 20° C. In addition the crude dimer was also found to contain about 20% of other butadiene dimer isomers and 20% of higher polymers largely trimer and tetramer. The unreacted residual gas contained substantially all of its original butenes and butanes and the bulk of its original acetylenes. The above crude dimer was very similar in composition to the product obtained by the same method from a feed stock consisting of pure butadiene.

The rate of dimerization is increased substantially by increasing either the temperature or the pressure. It is desirable to operate at as high a temperature and pressure as possible, therefore, without substantial vaporization of diene. It is possible to operate beyond the critical temperature and pressure in many instances by the use of the following modifications of the above process:

By adding a relatively non-volatile solvent, such as kerosene, gas oil, etc., to the reaction mixture in the bomb, the effective critical temperature of the mixture may be raised above that of the diene therein and effectively liquid phase operation may be conducted above the critical temperature of the diene. Kerosene and gas oil are straight-run petroleum distillate fractions boiling above the gasoline range. Inert gases such as nitrogen, carbon dioxide, etc., may also be used to provide super-critical pressures as high as about 2000 lbs./sq. in., for example. By these modifications substantial conversions to dimer may be obtained with much shorter contact times than the 12 hours of the above example.

The above processes may be made semi-continuous by suitable arrangement of multiple units, some of which are being used while others are reacting and others are being charged or discharged.

An especially desirable type of continuous liquid phase process may be obtained by adding the feed to approximately the middle section of a reactor in the form of a distillation column. Operating under the above conditions, preferably near the critical temperature and pressure of the diene, the dimer is thus separated from the monomer as formed and may be removed at the bottom of the column while the unreacted gases are removed at the top of the column. Exceptionally high yields and high purity of product are obtained in this type of operation, possibly due to the continuous separation of dimer and monomer. This represses the formation of intermediate and high polymers, which are known to be produced in batch operations by the reaction of the dimer with the monomer. The column must be designed to provide for a relatively large liquid hold-upon the plates and the feed and production rates are so adjusted as to provide the necessary time of contact in the liquid phase in the column. For example, if an hour's contact time is required for the degree of conversion desired and the liquid hold-up in the column is 60 gallons, the feed rate should be approximately one gallon per minute. The contact time required will increase with the degree of conversion desired and also with decrease in temperature and pressure or in concentration of diene in the feed. With feed stocks containing about 5% to 90% diene, for example, and operating temperatures and pressure just below the critical temperature and pressure of the diene substantial conversion may be obtained at contact times between about 30 minutes and 30 hours. Certain dienes, such as cyclopentadiene, react more rapidly than others. The purity of the dimer as regards freedom from unreacted hydrocarbons normally taken overhead and vice versa will be improved by increasing the number of plates in the column according to well known principles of distillation. The bottoms dimer fraction may be further purified by distillation or treatment as desired.

By the term "dienes" used herein and in the claims, it is meant to include not only conjugated dienes but other dienes which will isomerize to conjugated dienes under the conditions of the reaction. By the term "oxidizing agents," it is meant to include also not only gaseous mixtures containing oxygen, such as air, but also to include compounds which contain available oxygen, such as for example peroxides, which may decompose under reaction conditions to form oxygen.

Other modifications of the process which would occur to one skilled in the art and are not previously disclosed are to be included in the invention as defined in the following claims.

I claim:

1. A process for the production of a dimer of a conjugated diolefin containing fewer than about 7 carbon atoms which comprises subjecting the hydrocarbon mixture containing said diolefin as well as a mono-olefin having approximately the same boiling point, to a temperature above the critical temperature of said diolefin and a pressure above the critical pressure of said diolefin, in the presence of a liquid straight-run petroleum distillate fraction boiling above the gasoline range, whereby the reaction mixture is maintained substantially in the liquid phase, and said diolefin is dimerized without substantial polymerization of said mono-olefin.

2. A process according to claim 1 in which the diolefin is butadiene.

3. A process according to claim 1 in which the diolefin is isoprene.

4. A process according to claim 1 in which the diolefin is cyclopentadiene.

THOMAS F. DOUMANI.